United States Patent
Chase et al.

(10) Patent No.: US 9,889,478 B2
(45) Date of Patent: Feb. 13, 2018

(54) CONSUMABLE DESCALING CARTRIDGES FOR A REFRIGERATOR APPLIANCE

(71) Applicant: Whirlpool Corporation, Benton Harbor, MI (US)

(72) Inventors: Kevin M. Chase, St. Joseph, MI (US); Thomas Dell Spicer, St. Joseph, MI (US); Lindsey Ann Wohlgamuth, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 1297 days.

(21) Appl. No.: 13/674,266

(22) Filed: Nov. 12, 2012

(65) Prior Publication Data

US 2014/0130890 A1    May 15, 2014

(51) Int. Cl.
| | |
|---|---|
| *B67D 7/06* | (2010.01) |
| *B67D 7/14* | (2010.01) |
| *B67D 7/56* | (2010.01) |
| *B67D 7/76* | (2010.01) |
| *B67D 7/80* | (2010.01) |
| *B08B 3/00* | (2006.01) |

(Continued)

(52) U.S. Cl.
CPC ............ *B08B 9/027* (2013.01); *B67D 7/36* (2013.01); *B67D 7/78* (2013.01); *F25D 1/02* (2013.01); *B67D 7/766* (2013.01); *C02F 2307/12* (2013.01); *F25D 2323/121* (2013.01); *F25D 2331/806* (2013.01); *F25D 2700/121* (2013.01); *Y10T 137/0424* (2015.04); *Y10T 137/4238* (2015.04)

(58) Field of Classification Search
None
See application file for complete search history.

(56) References Cited

U.S. PATENT DOCUMENTS

| | | |
|---|---|---|
| 630,870 A | 8/1899 | Driesbach |
| 773,946 A | 11/1904 | Langill |

(Continued)

FOREIGN PATENT DOCUMENTS

| | | |
|---|---|---|
| CN | 201906509 U | 7/2011 |
| DE | 3700372 C1 | 12/1987 |

(Continued)

OTHER PUBLICATIONS

European Patent Application No. 13191965.6 filed Nov. 7, 2013, Applicant: Whirlpool Europe S.r.l, European extended report dated Jan. 17, 2014.

(Continued)

*Primary Examiner* — Clare M Perrin
(74) *Attorney, Agent, or Firm* — Diederiks & Whitelaw, PLC

(57) ABSTRACT

A method of descaling a water dispensing system included in a refrigerator appliance with a water dispenser is disclosed. The method of descaling includes the step of removing a water filter cartridge from a filter port of the refrigerator appliance wherein the filter port is in fluid communication with the water dispenser. The method also includes the step of inserting a descaling cartridge containing descaling fluid into the filter port of the refrigerator appliance. The method further includes the step of advancing the descaling fluid from the descaling cartridge through the water dispenser.

19 Claims, 3 Drawing Sheets

(51) Int. Cl.
  *B08B 9/027* (2006.01)
  *B67D 7/36* (2010.01)
  *F25D 1/02* (2006.01)
  *B67D 7/78* (2010.01)
  *C02F 1/00* (2006.01)
  *C02F 1/02* (2006.01)
  *F25D 1/00* (2006.01)
  *F25D 17/00* (2006.01)

(56) References Cited

U.S. PATENT DOCUMENTS

| | | | |
|---|---|---|---|
| 1,259,498 | A | 3/1918 | Elmore |
| 3,714,292 | A | 1/1973 | Baum et al. |
| 3,891,555 | A | 6/1975 | Bennett et al. |
| 4,207,994 | A | 6/1980 | Offlee |
| 4,757,921 | A | 7/1988 | Snowball |
| 4,792,059 | A | 12/1988 | Kerner |
| 4,808,303 | A | 2/1989 | Edwards et al. |
| 4,828,698 | A | 5/1989 | Jewell et al. |
| 4,909,937 | A | 3/1990 | Hoffmann et al. |
| 5,160,038 | A | 11/1992 | Harada et al. |
| 5,273,649 | A | 12/1993 | Magnusson |
| 5,586,439 | A | 12/1996 | Schlosser et al. |
| 5,635,063 | A | 6/1997 | Rajan et al. |
| 5,715,699 | A | 2/1998 | Coates et al. |
| 5,826,854 | A | 10/1998 | Janvrin et al. |
| 6,080,313 | A | 6/2000 | Kelada |
| 6,099,735 | A | 8/2000 | Kelada |
| 6,101,835 | A | 8/2000 | Butsch et al. |
| 6,572,769 | B2 | 6/2003 | Rajan et al. |
| 6,675,593 | B1 | 1/2004 | Suydam |
| 6,800,200 | B2 | 10/2004 | Bassett et al. |
| 7,000,894 | B2 | 2/2006 | Olson et al. |
| 7,043,150 | B2 | 5/2006 | Krause et al. |
| 7,047,754 | B2 | 5/2006 | An et al. |
| 7,081,201 | B2 | 7/2006 | Bassett et al. |
| 7,125,434 | B2 | 10/2006 | Yavorsky et al. |
| 7,130,533 | B2 | 10/2006 | Kim et al. |
| 7,137,272 | B2 | 11/2006 | Park et al. |
| 7,163,625 | B1 | 1/2007 | Williamson et al. |
| 7,207,189 | B2 | 4/2007 | An et al. |
| 7,276,161 | B2 | 10/2007 | Rajan et al. |
| 7,413,663 | B2 | 8/2008 | Rajan et al. |
| 7,610,849 | B2 | 11/2009 | Bigge et al. |
| 7,610,932 | B2 | 11/2009 | Olson et al. |
| 7,614,508 | B2 | 11/2009 | Mitchell et al. |
| 7,640,766 | B2 | 1/2010 | Shelton |
| 7,748,570 | B2 | 7/2010 | Bordino |
| 7,814,769 | B2 | 10/2010 | Kim et al. |
| 7,823,407 | B2 | 11/2010 | Lim et al. |
| 7,985,343 | B2 | 7/2011 | Haldopoulos et al. |
| 2002/0110482 | A1 | 8/2002 | Lawton |
| 2003/0034285 | A1 | 2/2003 | Hembree |
| 2004/0129617 | A1 | 7/2004 | Tanner |
| 2004/0211717 | A1 | 10/2004 | Mitchell et al. |
| 2005/0089458 | A1 | 4/2005 | Oke |
| 2006/0049096 | A1 | 3/2006 | Bassett |
| 2006/0080991 | A1* | 4/2006 | An et al. .................... 62/389 |
| 2006/0144066 | A1 | 7/2006 | Lee et al. |
| 2007/0084772 | A1 | 4/2007 | Holler |
| 2007/0138096 | A1* | 6/2007 | Tarr et al. ................ 210/650 |
| 2007/0241045 | A1 | 10/2007 | Kott |
| 2007/0251261 | A1 | 11/2007 | Son et al. |
| 2007/0272620 | A1 | 11/2007 | Chaney |
| 2008/0035552 | A1 | 2/2008 | Lee |
| 2009/0008318 | A1 | 1/2009 | Anes et al. |
| 2009/0045106 | A1 | 2/2009 | Kuennen et al. |
| 2009/0077992 | A1 | 3/2009 | Anderson |
| 2009/0173675 | A1 | 7/2009 | Scholz |
| 2009/0217694 | A1 | 9/2009 | Kim |
| 2009/0249821 | A1 | 10/2009 | Zentner |
| 2009/0293735 | A1 | 12/2009 | Van Dillen et al. |
| 2009/0314703 | A1 | 12/2009 | Beach |
| 2009/0321335 | A1* | 12/2009 | Siemer et al. ............. 210/175 |
| 2010/0059455 | A1 | 3/2010 | Hsueh et al. |
| 2010/0175415 | A1 | 7/2010 | Kim |
| 2010/0219131 | A1 | 9/2010 | Levy |
| 2010/0221394 | A1 | 9/2010 | Gaulard |
| 2010/0243581 | A1 | 9/2010 | Williams |
| 2011/0005398 | A1* | 1/2011 | Garcia ............... A47J 31/057 |
| | | | 99/280 |
| 2011/0006009 | A1 | 1/2011 | Hamlin et al. |
| 2011/0030732 | A1* | 2/2011 | Boussemart ................ 134/18 |
| 2011/0068053 | A1 | 3/2011 | Kim et al. |
| 2011/0185762 | A1 | 8/2011 | Kruckenberg et al. |
| 2011/0198301 | A1 | 8/2011 | Haldopoulos et al. |
| 2011/0278242 | A1 | 11/2011 | Levy |
| 2011/0278243 | A1 | 11/2011 | Levy |

FOREIGN PATENT DOCUMENTS

| | | |
|---|---|---|
| DE | 202008007246 U1 | 11/2008 |
| JP | 63175685 A | 7/1988 |
| JP | 4227009 A | 8/1992 |
| WO | 2002036248 A1 | 5/2002 |
| WO | 2008062948 A1 | 5/2008 |

OTHER PUBLICATIONS

European Patent Application No. 13191729.6 filed Nov. 6, 2013, Applicant: Whirlpool Europe S.r.l, European extended report dated Feb. 13, 2014.

European Patent Application No. 13192204.9 filed Nov. 8, 2013, Applicant: Whirlpool Europe S.r.l, European extended report dated Feb. 13, 2014.

European Patent Application No. 13191798.1 filed Nov. 6, 2013, Applicant: Whirlpool Europe S.r.l, European extended search report dated Feb. 13, 2014.

* cited by examiner

CONSUMABLE DESCALING CARTRIDGES FOR A REFRIGERATOR APPLIANCE

TECHNICAL FIELD

The present disclosure relates generally to descaling cartridges, and, more particularly, to descaling cartridges for use with a domestic refrigerator.

BACKGROUND

A domestic refrigerator is a device that is used to store food items in a home. Domestic refrigerators typically include a refrigerated compartment into which food items may be placed to preserve the food items for later consumption and a door that permits user access to the refrigerated compartment. Many domestic refrigerators also include a dispenser in the door that is operable to dispense water or ice. Sometimes, the water dispensing system providing water to the dispenser may become clogged by calcium carbonate, commonly known as scale.

SUMMARY

According to one aspect of the disclosure, a method of descaling a water dispensing system included in a refrigerator appliance with a water dispenser is taught. The method of descaling includes (i) removing a water filter cartridge from a filter port of the refrigerator appliance, (ii) inserting a descaling cartridge containing descaling fluid into the filter port of the refrigerator appliance, and (iii) advancing the descaling fluid from the descaling cartridge through the water dispenser. The filter port included in the refrigerator appliance may be in fluid communication with the water dispenser.

In some embodiments, the method may also include advancing the descaling fluid through a water heating assembly. The water heating assembly may include a flow-through heating element.

The refrigerator appliance may include a user interface configured to receive user inputs and to display information. In some embodiments, the descaling fluid from the descaling cartridge may be advanced through the water dispenser in response to a user input received by the user interface initiating a descaling cycle. The user interface may display information indicating scale build-up is present in the water dispensing system.

In some embodiments, the water dispensing system may include a pressure sensor. The user interface may be configured to display information indicating scale build-up is present in the water dispensing system in response to the pressure sensor measuring a threshold pressure.

In some embodiments, the water dispensing system may include a temperature sensor situated between the water heating assembly and the water dispenser. The user interface may be configured to display information indicating scale build-up is present in the water dispensing system in response to the temperature sensor measuring a threshold temperature.

In some embodiments, the user interface may be configured to display information indicating that the descaling cycle is complete. The information may be displayed after fluid from the descaling cartridge is advanced through the water dispenser.

According to another aspect of the present disclosure, a domestic refrigerator appliance includes a main valve, a water heating assembly, a hot water valve, a dispenser coupled to the water heating assembly, a descaling cartridge, a user interface, and a controller. The main valve may be configured to receive pressurized water from a domestic water source. The hot water valve is openable to advance water from the main valve to the water heating assembly. The descaling cartridge contains descaling fluid in fluid communication with the water heating assembly. The controller is electrically coupled to the hot water valve, the water heating assembly, and the user interface. The controller is configured to (i) reconfigure the display to request a descaling cycle, (ii) receive a user input from the user interface requesting a descaling cycle, and (iii) open the hot water valve in response to the user input requesting the descaling cycle so that descaling fluid is introduced into water advancing through the water heating assembly and the dispenser.

In some embodiments, the domestic refrigerator appliance may also include a fluid pressure sensor in electrical communication with the controller. The controller may be configured to display the request for the descaling cycle in response to the fluid pressure sensor indicating a pressure above a first threshold pressure.

In some embodiments, the controller may be configured to lock the hot water valve in a closed position in response to the fluid pressure sensor indicating a pressure above a second threshold pressure. The controller may maintain the hot water valve in the closed and locked position until the controller receives user input from the user interface initiating the descaling cycle. The second threshold pressure may be greater than the first threshold pressure.

In some embodiments, the domestic refrigerator appliance may also include a fluid temperature sensor in electrical communication with the controller. The fluid temperature sensor may be situated between the fluid heating assembly and the dispenser. The controller may be configured to display the request for the descaling cycle in response to the fluid temperature sensor indicating a temperature between the water heating assembly and the dispenser above a first threshold temperature.

In some embodiments, the controller may be configured to lock the hot water valve in a closed position in response to the fluid temperature sensor indicating a temperature between the water heating assembly and the dispenser is above a second threshold temperature. The controller may maintain the hot water valve in the closed and locked configuration until the controller receives user input from the user interface initiating the descaling cycle. The second threshold temperature may be greater than the first threshold temperature.

In some embodiments, the domestic refrigerator appliance also includes an inlet temperature sensor and an outlet temperature sensor. The inlet temperature sensor may be located near the inlet of the water heating assembly and may be in electrical communication with the controller. The outlet temperature sensor may be located near the outlet of the water heating assembly and may be in electrical communication with the controller. The controller may be configured to disable the water heating assembly in response to detection of a temperature difference between the inlet temperature sensor and the outlet temperature sensor outside a predetermined range.

In some embodiments, the domestic refrigerator appliance may also include a filter port interposed between the main valve and the water heating assembly. The filter port may be configured to receive the descaling cartridge. The water heating assembly may include a flow-through heating element.

BRIEF DESCRIPTION OF THE DRAWINGS

The detailed description particularly refers to the following figures, in which.

DETAILED DESCRIPTION OF THE DRAWINGS

Figure 1:
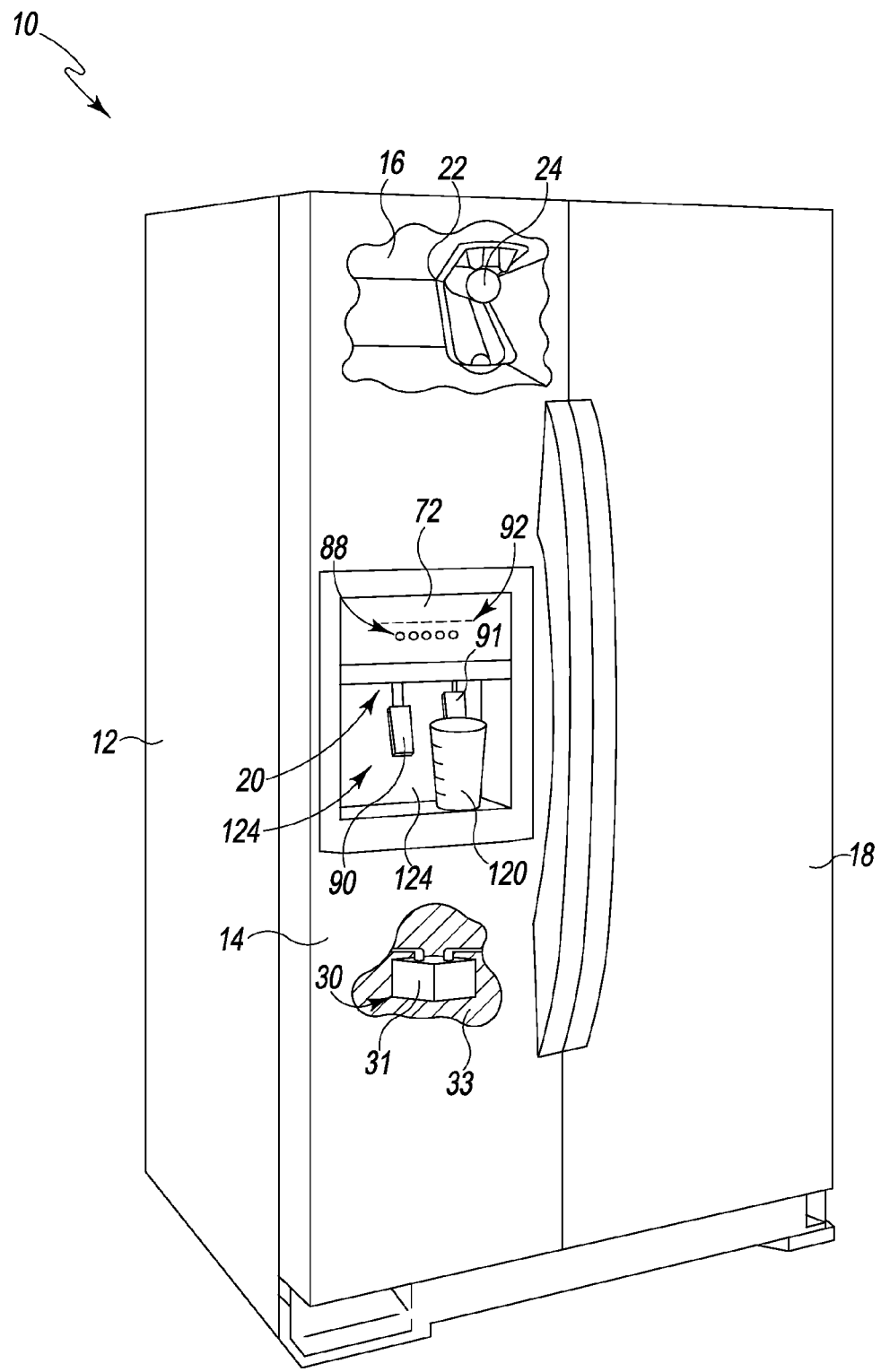
FIG. 1 is a perspective view of a domestic refrigerator showing a portion of a door cut away to show a water filter port configured to receive a descaling cartridge.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, a home appliance is shown as a domestic refrigerator appliance 10 (hereinafter refrigerator 10). One example of a domestic refrigerator is the Whirlpool 25 cubic feet Side-by-Side Refrigerator Model No. ED5KVEXVQ, which is commercially available from Whirlpool Corporation of Benton Harbor, Mich., U.S.A. The refrigerator 10 includes a cabinet 12, a refrigerator door 14 for accessing a refrigerated compartment 16 of the refrigerator 10, and a freezer door 18 for accessing a frozen compartment (not shown) of the refrigerator 10.

The refrigerator 10 also includes a dispenser 20 coupled to the refrigerator door 14 and a water filter port 22 located inside the refrigerated compartment 16 of the cabinet 12. A descaling cartridge 24 is sized to be received in the water filter port 22. The dispenser 20 is configured to dispense cold water, hot water, and/or ice from the refrigerator 10. The water filter port 22 is fluidly coupled to the dispenser 20 and is configured to receive removable water filters that filter water (both liquid and ice) dispensed through dispenser 20. The descaling cartridge 24 is configured to be installed in the water filter port 22 to disperse descaling solution in the water lines leading to the dispenser 20 so that scale build-up in the water lines can be flushed through the dispenser 20.

Figure 2:
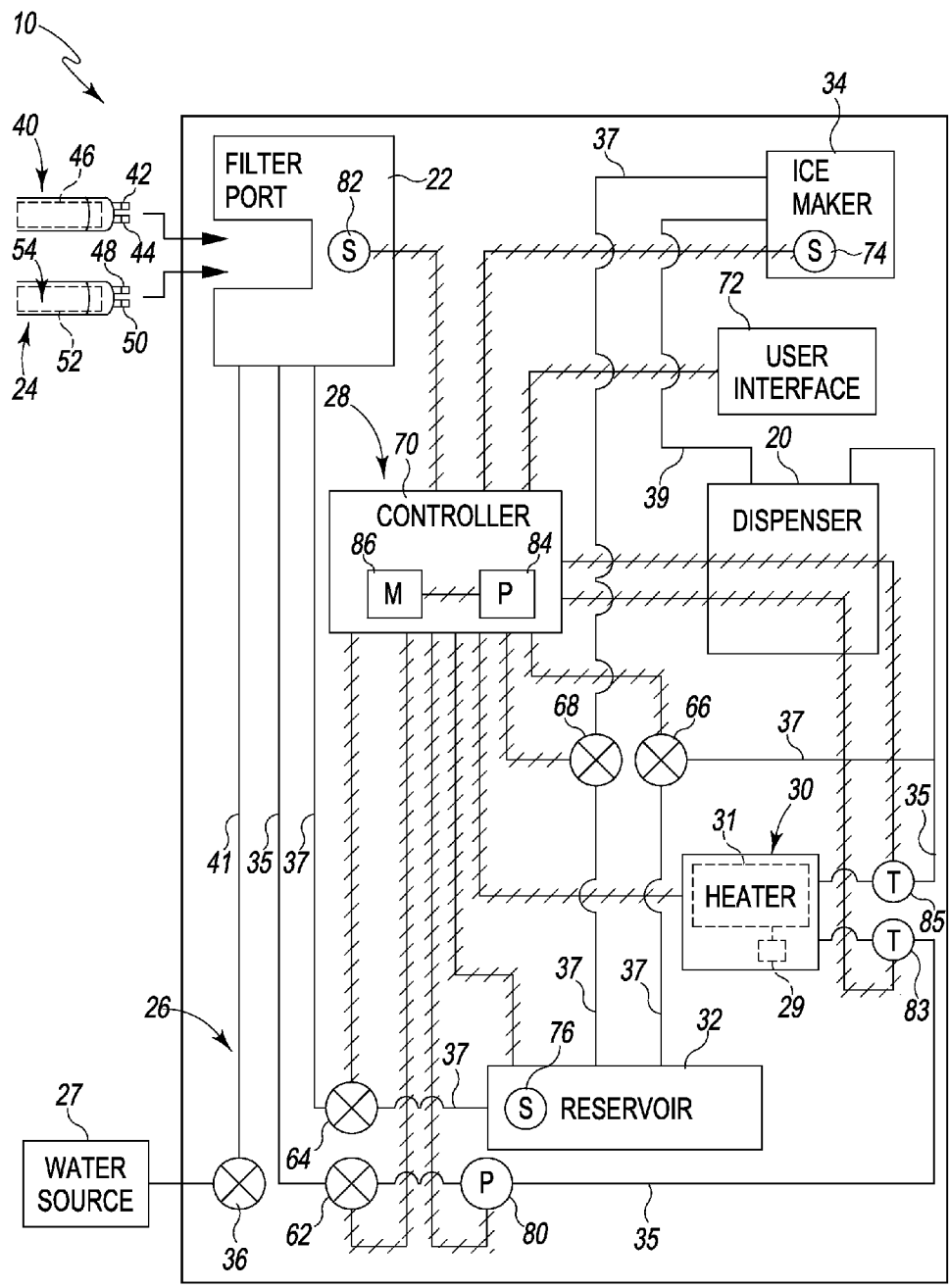
FIG. 2 is a diagrammatic view of the domestic refrigerator of FIG. 1.

Turning now to FIG. 2, the refrigerator 10 includes a water system 26 and a control system 28 for controlling the water system 26. The water system 26 directs water from a water source 27 to the dispenser 20. The control system 28 is operable to control the various components of the water system 26 so that the dispenser 20 dispenses cold water, hot water, or ice. The control system 28 is also operable to control the water system 26 during a pre-programmed descaling cycle or other pre-programmed cycle.

The water system 26 includes a number of components for conditioning water to be discharged through the dispenser 20. In particular, the water system has a heating assembly 30, a cold water reservoir 32, and an icemaker 34. The heating assembly 30 includes a flow-through heating element 31 and a thermal fuse 29 configured to cut power to the flow-through heating element 31 when the flow-through heating element 31 reaches a predetermined temperature. The heating assembly 30 is positioned between the water filter port 22 and the dispenser 20 along a hot water line 35.

The cold water reservoir 32 accumulates and cools water in the refrigerator 10 prior to the water being discharged through the dispenser 20 or supplied to the ice maker 34. The cold water reservoir 32 is positioned between the water filter port 22 and the dispenser 20 along a cold water line 37. The icemaker 34 receives cold water from the cold water reservoir 32 and generates ice that is discharged through the dispenser 20 via an ice line 39.

One exemplary flow-through heating element 31 is a Ferro Flow Through Heater (FTH) available from Davidson Industries, Inc. of Warwick, R.I. The flow-through heating element 31 is positioned in the refrigerator door 14 below the dispenser 20 and outside a refrigerator insulation layer 33 as shown, for example, in FIG. 1. The flow-through heating element 31 is illustratively oriented in a flat orientation so that water flows in a substantially horizontal direction through the flow-through heating element 31. In some embodiments, the flow-through heating element 31 may be a thermoblock element, a microwave element, or another suitable type of heating element. Additionally, the heating element may be positioned in another location in the door 14 or the cabinet 12 and may be placed in a number of orientations relative thereto. In alternative embodiments of the present disclosure, the flow-through heating element 31 may be replaced or augmented by a batch heating system including a heating element and a hot water reservoir.

All the water (liquid or ice) dispensed by the refrigerator 10 passes through the water filter port 22. The water system 26 includes a main valve 36 coupled to the water source 27 and the water filter port 22 is coupled to the main valve 36 via a water inlet line 41. The hot water line 35 and the cold water line 37 extend from the water filter port 22 directing water through the rest of the water system 26. The main valve 36 can be manually opened or closed to selectively allow water from the water source 27 to enter the water system 26 of the refrigerator 10.

The water filter port 22 is configured to receive a water filter cartridge 40 or the descaling cartridge 24. The water filter cartridge 40 is illustratively consumable and discarded after use. The water filter cartridge 40 includes an inlet 42, an outlet 44, and a filter media 46 as is known in the art. In other embodiments, the water filter cartridge 40, or portions thereof, may be reusable. The descaling cartridge 24 is illustratively consumable and is charged to supply enough descaling agent 54 for one descaling cycle. In other embodiments, the descaling cartridge 24 may be refillable and/or reusable.

The descaling cartridge 24 includes an inlet 48, an outlet 50, and a descaling packet 52 containing descaling agent 54. The inlet 48 is open to the water lines of the refrigerator 10. The descaling packet 52 is coupled to the outlet 50 and is squeezed by water flowing into the descaling cartridge 24 so that the descaling agent 54 is dispensed through the outlet 50 into the water lines. Water ceases to flow into the descaling cartridge 24 when the descaling cartridge 24 is full of water and the descaling packet 52 is emptied. The descaling agent 54 is then advanced through the water system 26 and reacts with the scale built up in the water system 26 so that the scale can be flushed out of the water system 26 when the reacted descaling agent 54 is discharged through the dispenser 20. In the illustrative embodiment, the descaling agent 54 is a solution with about an 8% concentration of acetic acid. In other embodiments, other organic acids including but not limited to sulfonic acids or carboxylic acids, in particular, lactic acid, acetic acid, formic acid, oxalic acid, uric acid solutions may be used alone or mixtures thereof. It is also possible to use inorganic acids such as phosphoric acid, hydrochloric acid or sulfamic acid solutions. Mixtures of various inorganic and organic acids could also conceivably be used as descaling agents in accordance with embodiments of the present invention.

In other embodiments, the inlet 48 and the outlet 50 may both be open to the water lines of the refrigerator 10. In such embodiments, the descaling packet 52 may be open inside the descaling cartridge 24 or opened when water enters the descaling cartridge 24 so that water flowing through the descaling cartridge is mixed with descaling agent. The water mixing with the descaling agent 54 dilutes and carries the descaling agent through the water lines of the refrigerator 10. In some such embodiments, the descaling agent 54 may be a liquid descaling agent or a solid agent.

The water system 26 further includes a number of electronically controlled valves that can be operated to supply hot or cold water to the dispenser 20 or to supply cold water to the icemaker 34. Specifically, the water system includes a hot water valve 62, a cold water valve 64, a cold water dispenser valve 66, and an icemaker valve 68. The hot water valve 62 is coupled between the water filter port 22 and the dispenser 20 along the hot water line 35. The cold water valve 64 is coupled between the water filter port 22 and the dispenser 20 along the cold water line 37. The cold water dispenser valve 66 is coupled between the cold water reservoir 32 and the dispenser 20 along the cold water line 37. The icemaker valve 68 is coupled between the cold water reservoir 32 and the icemaker 34 along the cold water line 37.

In operation, the hot water valve 62 can be opened to advance water from the water source 27 through the heating assembly 30 to the dispenser 20. The cold water valve 64 can be opened to advance water from the water source 27 to the cold water reservoir 32. The cold water dispenser valve 66 can be opened to advance cold water from the cold water reservoir 32 to the dispenser 20. The icemaker valve 68 can be opened to advance water from the cold water reservoir 32 to the icemaker 34. Otherwise, each of the valves 62, 64, 66, 68 are biased closed to prevent water from being advanced through the water system 26.

The control system 28 of the refrigerator 10 illustratively includes a controller 70, a user interface 72, and a number of sensors 74, 76, 80, 82, 83, 85. The controller 70 is configured to operate the components of the water system 26 in response to inputs from the user interface 72 and the sensors 74, 76, 80, 82, 83, 85. The user interface 72 is configured to display information and to receive user inputs. The sensors 74, 76, 80, 82, 83, 85 detect information and communicate information to the controller 70.

The controller 70 includes a number of electronic components commonly associated with electronic units which are utilized in the control of electromechanical systems. For example, the controller 70 may include, amongst other components customarily included in such devices, a processor such as a microprocessor 84 and a memory device 86 such as a programmable read-only memory device ("PROM") including erasable PROM's (EPROM's or EEPROM's). The memory device 86 is provided to store, amongst other things, instructions in the form of, for example, a software routine (or routines) which, when executed by the processor, allows the controller 70 to control operation of the water system 26 and other systems included in the refrigerator 10.

The user interface 72 is illustratively coupled to the controller 70 for two way communication via a signal line as shown in FIG. 2. User interface 72 includes buttons 88, paddles 90, 91, and indicator lights 92 as shown in FIG. 1.

The buttons 88 may be pressed to receive user inputs requesting that water dispensed be cold or hot, that ice dispensed be cubed or crushed, or that pre-programmed cycles (such as the descaling cycle) be performed by the refrigerator 10. The paddles 90, 91 may be pressed so that the controller 70 receives inputs requesting that water or ice be discharged by the dispenser 20. The indicator lights 92 may be used to indicate the temperature of water to be dispensed, the type of ice to be dispensed, the status of the water filter cartridge 40, the need for a descaling cycle, the availability of one or more functions of the refrigerator 10, or other information. In some embodiments, the user interface 72 may include a graphic display, a touch screen, or other interface operable to display information and to receive user inputs.

The controller 70 is electrically coupled to each of the sensors 74, 76, 80, 82, 83, 85 to receive inputs from each of the sensors 74, 76, 80, 82, 83, 85 as shown in FIG. 2. In particular, the sensors 74, 76, 80, 82, 83, 85 include an ice level sensor 74, a reservoir sensor 76, temperature sensors 83, 85, a pressure sensor 80, and a filter port sensor 82. The ice level sensor 74 is coupled to the controller 70 via a signal line and is configured to detect if an ice bucket (not shown) included in the ice maker 34 is full. The reservoir sensor 76 is coupled to the controller 70 via a signal line and is configured to detect if the cold water reservoir 32 is full. In the illustrative embodiment, water discharged through the dispenser 20 after being heated in the heating assembly 30 is between 175-185 degrees F. and is typically about 180 degrees F. In other embodiments, water discharged through the dispenser 20 after being heated in the heating assembly 30 may be hotter or cooler. The pressure sensor 80 is coupled to the controller 70 via a signal line and is configured to detect back pressure applied to the heating assembly 30 through the hot water valve 62. In some embodiments, the hot water valve 62 may be configured to regulate the pressure being supplied to the heater assembly 30. The filter port sensor 82 is coupled to the controller 70 via a signal line and is configured to detect the presence of the water filter cartridge 40 or the descaling cartridge 24. The temperature sensors 83, 85 are coupled to the controller 70 and are configured to monitor the temperature of water entering and exiting the heating assembly 30. If the temperature difference between the sensors 83, 85 across the heating assembly 30 is determined by the controller 70 to be outside a predetermined range, the controller 70 may disable the heating assembly 30.

Additionally, the controller 70 is electrically coupled to the electrically controlled valves 62, 64, 66, 68 and the heating assembly 30 as shown in FIG. 2. Specifically, the cold water valve 64 is coupled to the controller 70 via a signal line so that the controller 70 can direct the cold water valve 64 to open or close. The hot water valve 62 is coupled to the controller 70 via a signal line so that the controller 70 can direct the hot water valve 62 to open or close. The icemaker valve 68 is coupled to the controller 70 via a signal line so that the controller 70 can direct the icemaker valve 68 to open or close. The cold water dispenser valve 66 is coupled to the controller 70 via a signal line so that the controller 70 can direct the cold water dispense valve 66 to open or close. The heating assembly 30 is coupled to the controller 70 via a signal line so that the controller 70 can direct the heating assembly 30 to activate or deactivate the flow-through heating element 31.

Hence, the control system 28 including the controller 70 may be operated to control operation of the refrigerator 10. In particular, the controller 70 executes a routine including, among other things, a control scheme in which the controller 70 monitors outputs of the sensors 80, 85 in order to inform a user of detected scale build-up and to control the availability of hot water when water system 26 contains built up scale. To do so, the controller 70 communicates with the sensors 80, 85 in order to determine, among other things, if the water system 26, (and more particularly, if the components of the hot water line 35 that conducts water for the hot water function) is likely to contain a predetermined amount of scale build-up as indicated by an elevated temperature or pressure of water flowing through the dispenser 20. In some embodiments, the controller may communicate with both temperature sensors 83, 85 and compare the temperature rise across the heating assembly 30 to determine scale build up. Armed with this data, the controller 70 determines if a descaling cycle is desirable and if continued operation of the hot water function is allowable. Once it is determined if a descaling cycle is found to be desirable, the controller 70 can direct the user interface 72 to display a request for a user to initiate the descaling cycle. If the controller 70 determines that the continued operation of the hot water function is not allowable, the controller 70 can disable the water system 26 from providing hot water to the dispenser 20.

Figure 3:
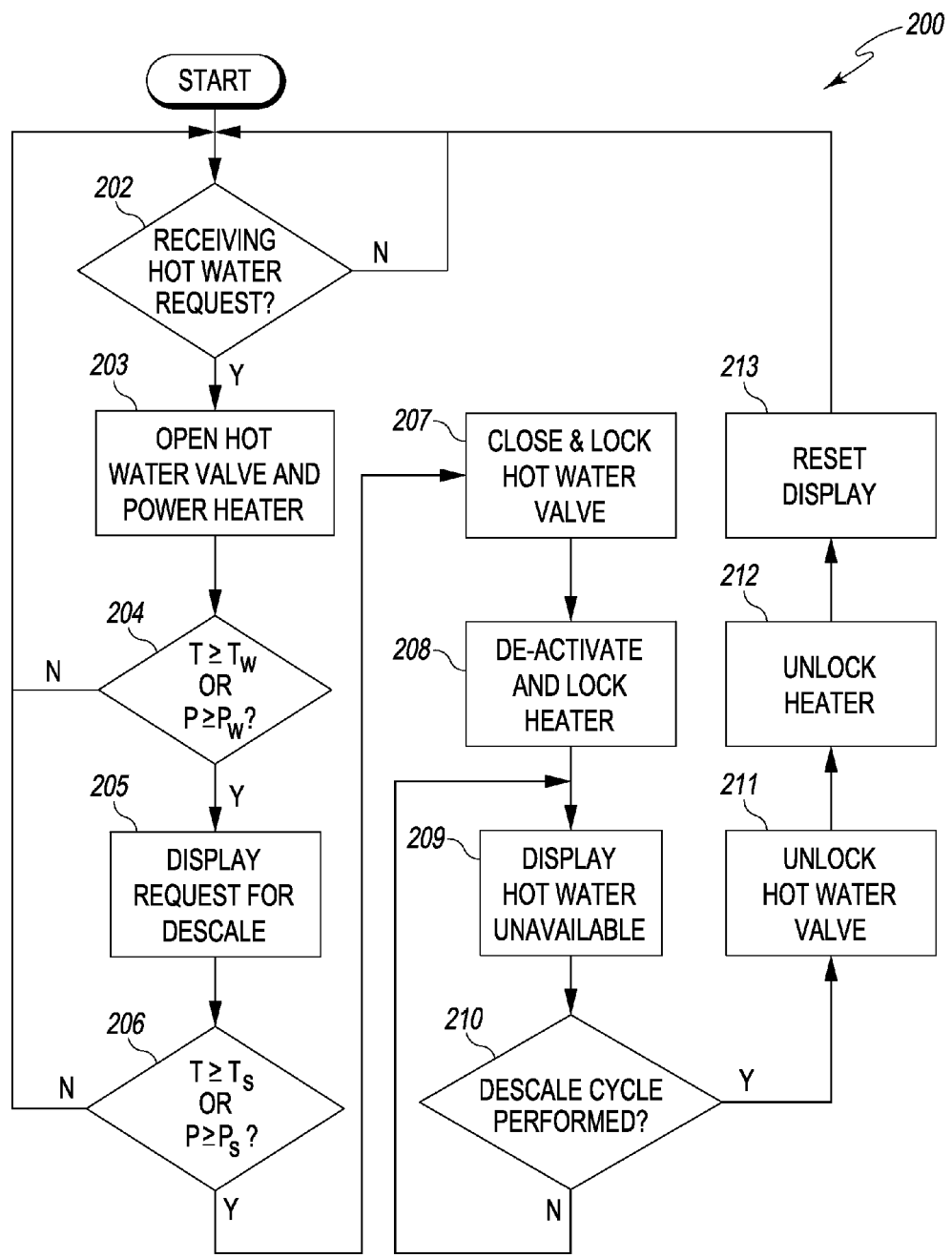
FIG. 3 is a flow chart of a control routine executed by the controller during operation of the domestic refrigerator of FIGS. 1 and 2.

Referring not to FIG. 3, there is shown a control routine 200 for operation of the refrigerator 10 when dispensing hot water. As shown in FIG. 3, the routine 200 begins with step 202 in which the controller 70 determines if a request for hot water is being received from the user interface 72 in response to a user operating the paddle and/or buttons 88, 91 of the user interface 72. If a hot water request is received by the controller 70, the routine 200 proceeds to step 203; otherwise, the routine 200 returns to step 202 to continue monitoring the output of the user interface 72. If, however, in step 202 a request for hot water is received by the controller 70, the routine 200 proceeds to step 203. In step 203, the controller 70 opens the hot water valve 62 and activates the flow-through heating element 31 of heating assembly 30 so that hot water is discharged through the dispenser 20. The routine 200 then proceeds to step 204.

In step 204, the controller 70 determines the temperature (T) of the water being supplied to the dispenser 20 and the pressure (P) applied to the heating assembly 30 from the temperature and the pressure sensors 80, 85 to determine if scale build-up has reached a predetermined level making descaling desirable. The controller 70 compares the sensed temperature (T) with a threshold warning temperature value ($T_W$) stored in the controller's memory 86. If the temperature (T) from the temperature sensor 85 is equal to or greater than the warning temperature value ($T_W$), then the routine 200 proceeds to step 205. Similarly, the controller 70 compares the sensed pressure (P) with a threshold warning pressure value ($P_W$) stored in memory 86. If the pressure (P) from the pressure sensor 80 is equal to or greater than the warning pressure value ($P_W$), then the routine 200 proceeds to step 205. If neither the temperature (T) nor the pressure (P) from the sensors 80, 85 equal or exceed the warning temperature value ($T_W$) or the warning pressure value ($P_W$), respectively, then the routine 200 returns to step 202 to continue monitoring output from the user interface 72.

In step 205, the controller 70 operates the user interface 72 to display a request for a descaling cycle. In the illustrative embodiment, the user interface 72 displays the request for descaling by lighting one or more of the indicator lights 92 associated with scale build-up. In other embodiments, the user interface 72 may display a text message or icon associated with scale build-up. When the user interface 72 has displayed a request for a descaling cycle, the routine 200 advances to step 206.

In step 206, the controller 70 determines if scale build-up has reached an elevated level that prevents function of the dispenser 20 to dispense hot water. The controller 70 compares the temperature (T) with a shut-off temperature value ($T_S$) stored in the controller's memory 86. If the temperature (T) from the temperature sensor 85 is equal to or greater than the shut-off temperature ($T_S$), then the routine 200 proceeds to step 207. Similarly, the controller 70 compares the pressure (P) with a shut-off pressure value ($P_S$) stored in the memory 86. If the pressure (P) from the pressure sensor 80 is equal to or greater than the shut-off pressure ($P_S$), then the routine 200 proceeds to step 207. If neither the temperature (T) nor the pressure (P) equal or exceed the shut-off temperature value ($T_S$) or pressure shut-off value ($P_S$), respectively, then the routine 200 returns to the step 202 to continue monitoring output from the user interface 72.

In step 207, the controller 70 closes the hot water valve 62 and applies a hot water valve software lock so that the controller 70 will not open the hot water valve 62 when the controller 70 receives a request for hot water from the user interface 72. When the hot water valve 62 is closed and locked, the routine 200 advances to step 208 and the controller 70 deactivates the flow-through heating element 31 of the heating assembly. In step 208, the controller 70 further applies a heating assembly software lock so that the controller 70 will not activate the flow-through heating element 31 of the heating assembly 30 when the controller 70 receives a request for hot water from the user interface 72.

When the hot water valve 62 and the heating element 31 locked so that no hot water is available to the dispenser 20, the routine 200 advances to step 209 to inform a user that hot water is not available from the refrigerator 10. In step 209, the user interface 72 displays a notice that hot water is no longer available by blinking one or more of the indicator lights 92. In other embodiments, the user interface 72 may display a text message or icon associated with hot water unavailability. When the user interface 72 has displayed the notice that hot water is no longer available, the routine 200 advances to step 210.

In step 210, the controller 70 determines if a descaling cycle has been performed so that hot water functionality can be restored to the refrigerator 10, otherwise, the routine loops back to step 209. In the illustrative embodiment, the controller 70 determines that the descaling cycle has been performed in response to receiving an input from the filter port sensor 82 indicating that the descaling cartridge 24 has been deposited in the water filter port 22 and receiving an input from the user interface 72 indicating that the user has initiated the descaling cycle. In other embodiments, the controller 70 may determine that the descaling cycle has been performed in response only to an input from the user interface 72 indicating that the user has initiated the descaling cycle.

In step 211, initiated when the controller 70 determines that the descaling cycle has been performed and scale build-up has been reduced, the controller 70 unlocks the hot water valve 62 so that the hot water valve 62 will open upon a request for hot water from a user. When the hot water valve 62 is unlocked, the routine 200 advances to step 212 and the controller 70 unlocks heating assembly 30 so that the heating assembly 30 will activate the flow-through heating element 31 upon a request for hot water from a user.

When the hot water valve 62 and the heating assembly 30 are unlocked so that hot water is available to the dispenser 20, the routine 200 advances to step 213 to inform a user that the descaling cycle is complete and that hot water is available from the refrigerator 10. In step 213, the user interface 72 is illustratively reset to give notice that the descaling cycle is complete and that hot water is available by deactivating the indicator lights 92 associated with hot water unavailability. In other embodiments, the user interface 72 may light one or more indicator lights 92, display a text message, or display an icon associated with hot water availability. When the user interface 72 has reset, the routine 200 loops back to step 202 to continue monitoring output from the user interface 72.

In the illustrative embodiment, the descaling cycle may be performed by a user of the refrigerator 10 in response to the user interface 72 requesting that the descaling cycle be performed, the user interface 72 indicating that hot water will not be available until the descaling cycle is performed, or as part of a user desired or scheduled cleaning/maintenance program. A method of descaling the water system 26 may include the steps of removing the water filter cartridge 40 from the water filter port 22 and inserting the descaling cartridge 24 into the water filter port 22. Once the descaling cartridge 24 is inserted into the water filter port 22, the descaling agent 54 in the descaling cartridge 24 may be advanced through the water system 26 and out of the dispenser 20.

The descaling agent 54 may flow through hot water valve 62 and the flow-through heating element 31 of the heating assembly 30 before being discharged through the dispenser 20. In the illustrative embodiment, the descaling agent 54 is mixed with water as it is advanced through the water system 26 and is discharged into a catch-cup 120. After the descaling agent 54 is advanced through the water system 26, the descaling cartridge 24 may be removed from the water filter port 22 and the catch-cup 120 may be emptied. Once the descaling cartridge 24 is removed from the water filter port 22, a new filter cartridge 40 may be inserted into the water filter port 22. In some embodiments, the catch-cup 120 may be filled and emptied more than once before the descaling agent 54 is completely advanced through the water system 26. The catch-cup 120 may be included in a kit with the descaling cartridge 24 and may be sized to receive a predetermined amount of fluid and to fit in a cavity 124 formed in the refrigerator door 14.

When the new filter cartridge 40 is inserted into the water filter port 22 after the descaling agent 54 has been advanced through the water system 26, the descaling cycle may include the step of flushing the water system 26. To flush the water system 26, flushing water may be advanced through the water system 26 and discharged through the dispenser 20 into the catch-cup 120. In some embodiments, the catch-cup 120 may be filled with flushing water and emptied more than once before the water system 26 is completely flushed.

The descaling agent 54 and subsequent flushing water may be advanced through the water system 26 in response to the controller 70 receiving a fluid advance input from the user interface 72. The fluid advance input may be sent from the user interface 72 to the controller 70 when a user presses one or more of the paddle and/or buttons 88, 91 included in the user interface 72 thereby initiating the descaling cycle.

In other applications, the above described system of using a descaling cartridge 24 with a water system 26 and a control system 28 may be wholly or partially integrated in devices other than refrigerator appliances. For example, some of the advantages achieved through implementation of the water system 26 and the control system 28 in the refrigerator appliance 10 would be similarly achieved in a countertop or free standing beverage dispensing appliance. Therefore, the scope of this disclosure is not intended to be limited to refrigerator appliances.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A method of descaling a water dispensing system included in a refrigerator appliance with a water dispenser, the refrigerator appliance including a main valve configured to receive pressurized water from a domestic water source, a water heating assembly, a hot water valve openable to advance water from the main valve to the water heating assembly, a user interface, and a controller electrically coupled to the hot water valve, the water heating assembly, and the user interface, wherein the controller is configured to (i) reconfigure a display to request a descaling cycle, (ii) receive a user input from the user interface requesting a descaling cycle, and (iii) open the hot water valve in response to the user input requesting the descaling cycle, the method comprising:
   removing a water filter cartridge from a filter port of the refrigerator appliance, the filter port being in fluid communication with the water dispenser,
   inserting a descaling cartridge containing descaling fluid into the filter port of the refrigerator appliance, and
   advancing the descaling fluid from the descaling cartridge through the water dispenser.

2. The method of claim 1, further comprising the step of advancing the descaling fluid through a water heating assembly.

3. The method of claim 1, wherein the descaling fluid from the descaling cartridge is advanced through the water dispenser in response to a user input received by the user interface initiating a descaling cycle.

4. The method of claim 3, wherein the user interface displays information indicating scale build-up in the water dispensing system.

5. The method of claim 4, wherein:
   the water dispensing system includes a pressure sensor, and
   the user interface is configured to display information indicating scale build-up in the water dispensing system in response to the pressure sensor measuring a threshold pressure.

6. The method of claim 4, wherein:
   the water dispensing system includes a temperature sensor situated between the water heating assembly and the water dispenser, and
   the user interface is configured to display information indicating scale build-up in the water dispensing system in response to the temperature sensor measuring a threshold temperature.

7. The method of claim 3, wherein the user interface is configured to display information indicating that the descaling cycle is complete after fluid from the descaling cartridge is advanced through the water dispenser.

8. A domestic refrigerator appliance comprising:
a main valve configured to receive pressurized water from a domestic water source,
a water heating assembly,
a hot water valve is openable to advance water from the main valve to the water heating assembly,
a dispenser coupled to the water heating assembly,
a descaling cartridge containing descaling fluid in fluid communication with the water heating assembly,
a user interface, and
a controller electrically coupled to the hot water valve, the water heating assembly, and the user interface, wherein the controller is configured to (i) reconfigure a display to request a descaling cycle, (ii) receive a user input from the user interface requesting a descaling cycle, and (iii) open the hot water valve in response to the user input requesting the descaling cycle so that descaling fluid is introduced into water advancing through the water heating assembly and the dispenser.

9. The domestic refrigerator appliance of claim 8, further comprising a fluid pressure sensor in electrical communication with the controller.

10. The domestic refrigerator appliance of claim 9, wherein the controller is configured to display the request for the descaling cycle in response to the fluid pressure sensor indicating a pressure above a first threshold pressure.

11. The domestic refrigerator appliance of claim 10, wherein the controller is configured to lock the hot water valve in a closed position in response to the fluid pressure sensor indicating a pressure above a second threshold pressure until the controller receives the user input from the user interface initiating the descaling cycle, the second threshold pressure being greater than the first threshold pressure.

12. The domestic refrigerator appliance of claim 8, further comprising a fluid temperature sensor in electrical communication with the controller and situated between the fluid heating assembly and the dispenser.

13. The domestic refrigerator appliance of claim 12, wherein the controller is configured to display the request for the descaling cycle in response to the fluid temperature sensor indicating a temperature between the water heating assembly and the dispenser above a first threshold temperature.

14. The domestic refrigerator appliance of claim 13, wherein the controller is configured to lock the hot water valve in a closed position in response to the fluid temperature sensor indicating a temperature between the water heating assembly and the dispenser above a second threshold temperature until the controller receives the user input from the user interface initiating the descaling cycle, the second threshold temperature being greater than the first threshold temperature.

15. The domestic refrigerator appliance of claim 8, further comprising an inlet temperature sensor, located near the inlet of the water heating assembly and in electrical communication with the controller, and an outlet temperature sensor located near the outlet of the water heating assembly and in electrical communication with the controller.

16. The domestic refrigerator appliance of claim 15, wherein the controller is configured to disable the water heating assembly in response to detection of a temperature difference between the inlet temperature sensor and the outlet temperature sensor outside a predetermined range.

17. The domestic refrigerator appliance of claim 8, further comprising a filter port interposed between the main valve and the water heating assembly, the filter port being configured to receive the descaling cartridge.

18. The domestic refrigerator appliance of claim 8, wherein the controller is further configured to determine if a descaling cycle is desirable, and wherein reconfiguring the display to request a descaling cycle includes reconfiguring the display to request that a user initiate a descaling cycle if the controller determines that a descaling cycle is desirable.

19. The domestic refrigerator appliance of claim 18, further comprising:
a fluid pressure sensor in electrical communication with the controller; or
a fluid temperature sensor in electrical communication with the controller, wherein the controller determines if a descaling cycle is desirable based on a pressure indicated by the fluid pressure sensor or a temperature indicated by the fluid temperature sensor.

* * * * *